(12) United States Patent
Galt et al.

(10) Patent No.: US 9,975,172 B2
(45) Date of Patent: May 22, 2018

(54) PREVENTATIVE MAINTENANCE SYSTEM

(75) Inventors: John Robert Galt, Nobleton (CA); Bryan Phillips, Brampton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 1163 days.

(21) Appl. No.: 11/763,460

(22) Filed: Jun. 15, 2007

(65) Prior Publication Data
US 2007/0294121 A1 Dec. 20, 2007

Related U.S. Application Data

(63) Continuation-in-part of application No. 11/454,713, filed on Jun. 16, 2006, now abandoned.

(51) Int. Cl.
| | |
|---|---|
| *G06Q 10/06* | (2012.01) |
| *B22D 17/32* | (2006.01) |
| *B22D 46/00* | (2006.01) |
| *B29C 45/76* | (2006.01) |
| *G05B 23/02* | (2006.01) |
| *G06Q 10/10* | (2012.01) |
| *G06Q 10/00* | (2012.01) |

(52) U.S. Cl.
CPC ............ *B22D 17/32* (2013.01); *B22D 46/00* (2013.01); *B29C 45/76* (2013.01); *B29C 45/768* (2013.01); *G05B 23/0283* (2013.01); *G06Q 10/06* (2013.01); *G06Q 10/0631* (2013.01); *G06Q 10/06311* (2013.01); *G06Q 10/06315* (2013.01); *G06Q 10/1097* (2013.01); *G06Q 10/20* (2013.01); *B29C 2945/76163* (2013.01); *B29C 2945/76943* (2013.01)

(58) Field of Classification Search
USPC ........................................ 705/8–10
See application file for complete search history.

(56) References Cited

U.S. PATENT DOCUMENTS

| | | |
|---|---|---|
| 3,750,134 A | 7/1973 | Weisend |
| 5,316,707 A | 5/1994 | Stanciu et al. |
| 5,972,256 A | 10/1999 | Wurst et al. |
| 6,175,934 B1 | 1/2001 | Hershey et al. |
| 6,192,325 B1 | 2/2001 | Piety et al. |

(Continued)

FOREIGN PATENT DOCUMENTS

| | | |
|---|---|---|
| CN | 1550314 A | 12/2004 |
| JP | 2265723 A | 10/1990 |

(Continued)

OTHER PUBLICATIONS

Koelsch, James R. Predictive Maintenance, The Smart Way to Cut Downtime, Automation World Magazine, Sep. 2005 (p. 53). Retrieved from the Internet.

(Continued)

*Primary Examiner* — Olabode Akintola

(57) ABSTRACT

A method and apparatus for real time preventative maintenance of a molding system. The molding system could be a metal molding system or a plastics molding system. The method and apparatus are capable for scheduling service, business billing and invoicing, parts management, a remote control of a molding system for assessing the need for preventative maintenance. The indication for preventative maintenance is based upon a real time operational status of the molding system.

16 Claims, 7 Drawing Sheets

(56) References Cited

U.S. PATENT DOCUMENTS

| | | | |
|---|---|---|---|
| 6,260,427 B1* | 7/2001 | Jones | G01N 3/58 |
| | | | 73/865.9 |
| 6,275,741 B1 | 8/2001 | Choi | |
| 6,311,101 B1 | 10/2001 | Kastner | |
| 6,425,293 B1* | 7/2002 | Woodroffe | G01F 23/0076 |
| | | | 73/708 |
| 6,446,123 B1* | 9/2002 | Ballantine | H04L 41/06 |
| | | | 709/223 |
| 6,643,801 B1 | 11/2003 | Jammu et al. | |
| 6,721,685 B2* | 4/2004 | Kodama | G05B 19/0428 |
| | | | 340/309.9 |
| 6,738,748 B2 | 5/2004 | Wetzer | |
| 6,792,040 B1* | 9/2004 | Davis | H03G 3/3036 |
| | | | 375/222 |
| 6,799,154 B1 | 9/2004 | Aragones et al. | |
| 6,816,815 B2* | 11/2004 | Takayama | G05B 23/0283 |
| | | | 702/184 |
| 6,862,555 B2 | 3/2005 | Yu et al. | |
| 6,957,687 B2 | 10/2005 | Hirata et al. | |
| 2002/0143421 A1 | 10/2002 | Wetzer | |
| 2002/0143443 A1 | 10/2002 | Betters et al. | |
| 2003/0158770 A1* | 8/2003 | Carlson | G06Q 10/06 |
| | | | 705/7.15 |
| 2004/0073468 A1* | 4/2004 | Vyas | G06Q 10/0631 |
| | | | 705/7.13 |
| 2004/0148136 A1 | 7/2004 | Sasaki et al. | |
| 2004/0153437 A1* | 8/2004 | Buchan | G06Q 10/06 |
| 2004/0173182 A1* | 9/2004 | Hedrick | F02D 9/02 |
| | | | 123/396 |
| 2004/0217501 A1 | 11/2004 | Hakoda | |
| 2005/0004821 A1 | 1/2005 | Garrow et al. | |
| 2006/0108809 A1* | 5/2006 | Scalzi | B60K 16/00 |
| | | | 290/55 |
| 2007/0050650 A1* | 3/2007 | Conroy | G06F 1/26 |
| | | | 713/300 |
| 2007/0093976 A1 | 4/2007 | Nishizawa et al. | |

FOREIGN PATENT DOCUMENTS

| | | |
|---|---|---|
| JP | 4074627 A | 3/1992 |
| JP | 2001058342 A | 3/2001 |

OTHER PUBLICATIONS

Thomas, S.J. Real-Time Production Control and Process Management for Injection Molding Processes. Electrical Engineering Problems in the Rubber and Plastics Industry, 1994, IEEE Conference Record of 1994 Forty-Sixth Annual Conference of, pp. 91-93,26,27 Apr. 1994.

* cited by examiner

PREVENTATIVE MAINTENANCE SYSTEM

CROSS-REFERENCE TO RELATED PATENT APPLICATION

This patent application is a continuation in part patent application of prior U.S. patent application Ser. No. 11/454,713 filed Jun. 16, 2006. This patent application also claims the benefit and priority date of prior U.S. patent application Ser. No. 11/454,713, filed Jun. 16, 2006.

TECHNICAL FIELD

The present invention generally relates to maintenance of molding systems, and more specifically the present invention relates to real time preventative maintenance and repair of injection molding systems, components, and parts. In the context of this invention, injection molding system includes both plastic and metal injection molding systems, molds, hot runners, supply/source/auxiliary equipment interacting with the molding system, and component parts of the molding system.

BACKGROUND

U.S. Pat. No. 6,738,748 to Wetzer and assigned to Accenture LLP relates to performing predictive maintenance on equipment. Wetzer discloses a data processing system and method to predict maintenance based upon one or more estimated parameters such as longevity, probability of failure (mean time between failure), and financial estimates.

United States Patent Application 2004/0148136 to Sasaki et al assigned to Toshiba Kikai Kabushiki Kaisha relates to a system for predictable maintenance of injection molding equipment. Sasaki discloses a data processing system and method for monitoring injection molding equipment where operational data is compared to theoretical estimated expected life data. For example, the hours of use may be compared to an expected life limit or, the maximum frequency of use may be compared to an expected life limit.

U.S. Pat. No. 6,175,934 to Hershey et al assigned to the General Electric Company relates to a satellite based remote monitoring system. The system places remote equipment into a test mode to perform remote predictive assessment. A disadvantage of this approach is the requirement to take a piece of equipment off-line to conduct the test.

U.S. Pat. No. 6,643,801 to Jammu et al and assigned to the General Electric Company relates to a method for analyzing fault log data and repair data to estimate time before a machine disabling failure occurs. Fault data and repair data are used to estimate the time before a failure occurs. Service information, performance information, and compartment failure information are analyzed to determine a performance deterioration rate to simulate a distribution of future service events. The system is based upon operational levels of vibration in contrast to ideal or acceptable levels of vibration.

U.S. Pat. No. 6,192,325 to Piety et al and assigned to the CSI Technology Company and relates to a method and apparatus for establishing a predictive maintenance database.

U.S. Pat. No. 6,799,154 to Aragones et al assigned to the General Electric Company relates to a system for predicting the timing of future service events of a product.

However, problems remain with the known prior art approaches that apply estimated or theoretical values to predictive maintenance. A component or part may fail in advance of the estimated values and there is no warning or indication that a component or part may fail in advance of the estimate values. A component or part may be replaced when it still has a good useful life. Any of these situations cause unnecessary expense and maintenance.

For example, the estimated useful life of an oil filter in the hydraulic circuit of a power pack might be 10,000 hours of operation. The prior art systems simply record the number of hours of usage, and then schedule a replacement of the oil filter when the hours of usage approach or reach the limit of 10,000 hours. However, if a seal fails or contaminants enter the oil system, the oil filer could fail in advance of reaching the limit, potentially causing damage to other components in the hydraulic system and power pack.

In addition, the prior art systems do not take into account different environmental aspects of operating equipment at different customer locations and different global locations around the world. For example, humidity, air temperature, cooling water quality, and altitude may impact the performance and reliability of a molding system. For example, some customers run equipment harder than other customers. The prior art systems do not take into account the aspect of supporting and maintaining such equipment on a global scale.

The prior art approaches relate to predictive maintenance. Predictive maintenance attempts to maximize the use of a component or part based upon statistical predetermined information in advance of a theoretical point of failure. However, predictive maintenance does not take into account events or indicators that warn of a premature failure in advance of the theoretical point of failure.

SUMMARY

According to a first aspect of the present invention, there is a method for real time preventative maintenance of a molding system by indicating an out of tolerance condition based upon a real time operational status, and creating a notice for preventative maintenance.

According to a second aspect of the present invention, there is an apparatus for real time preventative maintenance of a molding system including preventative maintenance logic, business system logic, service scheduling logic, and parts management logic. The preventative maintenance logic capable of receiving an indication for preventative maintenance based upon a real time operational status of said molding system under at least one of the following conditions:
  (a) the operational status is below an absolute minimum real time operation limit,
  (b) the operational status is below a minimum real time operational limit and has reached the maximum accumulated duration for being below the real time threshold operational limit,
  (c) the operational status is above an absolute maximum real time operational limit, or
  (d) the operational status is above a maximum real time operational limit and has reached the maximum accumulated duration for being above the real time threshold operational limit.

A technical effect, amongst other technical effects, of the present invention is real time sensing of operational data for assessment by the system to predict or indicate a potential failure in advance of actual failure. Indicating potential failures in advance of actual failures provides better up-time to customers. Other technical effects may also include any combination or permutation of proactive monitoring, diagnostics, and remote control of molding systems to assist with customer productivity, reduce unscheduled maintenance, and align with scheduled maintenance. For the manufacturer or customer service provider, better spare parts management and better access to the customer.

Preventative maintenance of the present invention is different from the prior art approaches of predictive maintenance. Preventative maintenance monitors sensors in real time to identify indicators of early or premature failure of components or parts. Preventative maintenance also monitors other conditions that would lead to premature failure of components or parts. Upon identification of these indicators, preventative maintenance will determine the best fit to a manufacturing cycle for maintenance of the molding system.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

DETAILED DESCRIPTION OF THE EXEMPLARY EMBODIMENTS

Figure 1:
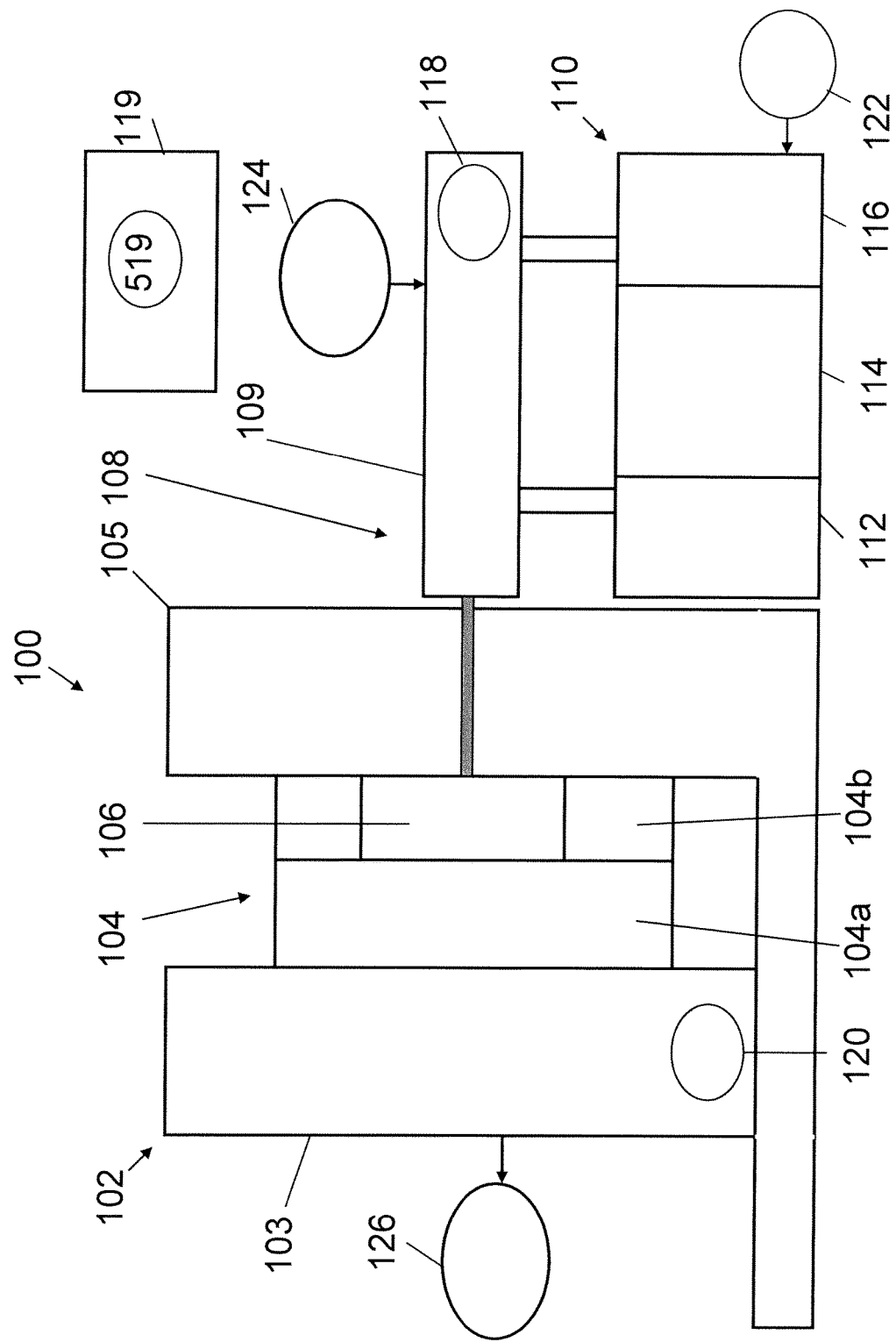
FIG. 1 is a schematic representation of an injection molding system.

Referring now to the schematic representation of a molding system 100 as illustrated in FIG. 1, the molding system may be a metal molding system or a plastics molding system. The molding system includes an injection unit 108 for creating a shot of melt. A drive 118 provides operational power for rotating and translating a screw (not shown). The drive 118 may be electric, hydraulic, or a combination of hydraulic and electric. A barrel 109 of the injection unit 108 includes heaters (not shown) to assist melting the raw material. Alternatively, the injection unit 108 could comprise a well known shooting pot style of injection unit.

A clamp is illustrated as 102. The clamp includes a pair of platens 103, 105 to receive a mold 104. While the presently-illustrated embodiment shows only two platens, molding systems 100 having a different number of platens are also within the scope of the invention. A drive 120 provides operational power to translate a moving platen 103 and to provide clamp tonnage. The drive 120 may be electric, hydraulic, or a combination of hydraulic and electric.

The mold 104 includes a hot half 104B and a cold half 104A and provides at least one core and cavity (not shown) to form a molded part. Alternatively, a rotary turret could be used, having multiple mold cold halves. Optionally, the mold 104 includes a hot runner 106 for distributing the melt within the mold 104. The hot runner 106 includes electrical heaters (not shown) for keeping a melt at an elevated temperature.

A power pack 110 is provided for the molding system 100. The power pack 110 includes a control system 114 to control the molding system 100, a hydraulic portion 112 to provide hydraulic power (if hydraulics are required). Preferably, the control system is an Intel® based computer with a Windows® based operating system such at the Husky® Polaris® Control System. Optionally, in the case of an all electric molding system 100, a hydraulic portion 112 is not required. The power pack 110 also includes electrical components (not shown) and circuitry 116.

The molding system may optionally include auxiliary equipment 119. Auxiliary equipment can include parts-handling equipment such as robots and conveyers, parts-treating equipment such as chillers or dryers, filters, part-assembling or filling equipment, or blow-molding equipment. Other auxiliary equipment 119 will occur to those of skill in the art.

The molding system 100 includes a connection to a supply 122. The supply 122 provides electrical power and chilled water to the molding system 100. Optionally, the chilled water may be applied to keep other devices cool, for example electric motors and electrical components (not shown).

In operation of the molding system 100, raw material 124 is feed into the injection unit 108. The injection unit creates a shot of melt. The clamp 102 closes the mold 104 and then applies tonnage to the mold 104. The injection unit 108 injects the shot of melt into the mold 104. When the formed part 126 is cooled, it is removed from the mold 104 and the process repeats.

Molding systems 100 are designed to run seven days a week, 24 hours a day producing molded parts, for example PET performs, or automotive parts. For example, a PET perform system may have the capability to produce 192 preforms every 15 seconds and an unscheduled down-time can have a significant financial impact to business. At the same time, known periodic maintenance can be planned for during an active production run and preventative maintenance can take advantage of known or scheduled down-times.

Figure 2:
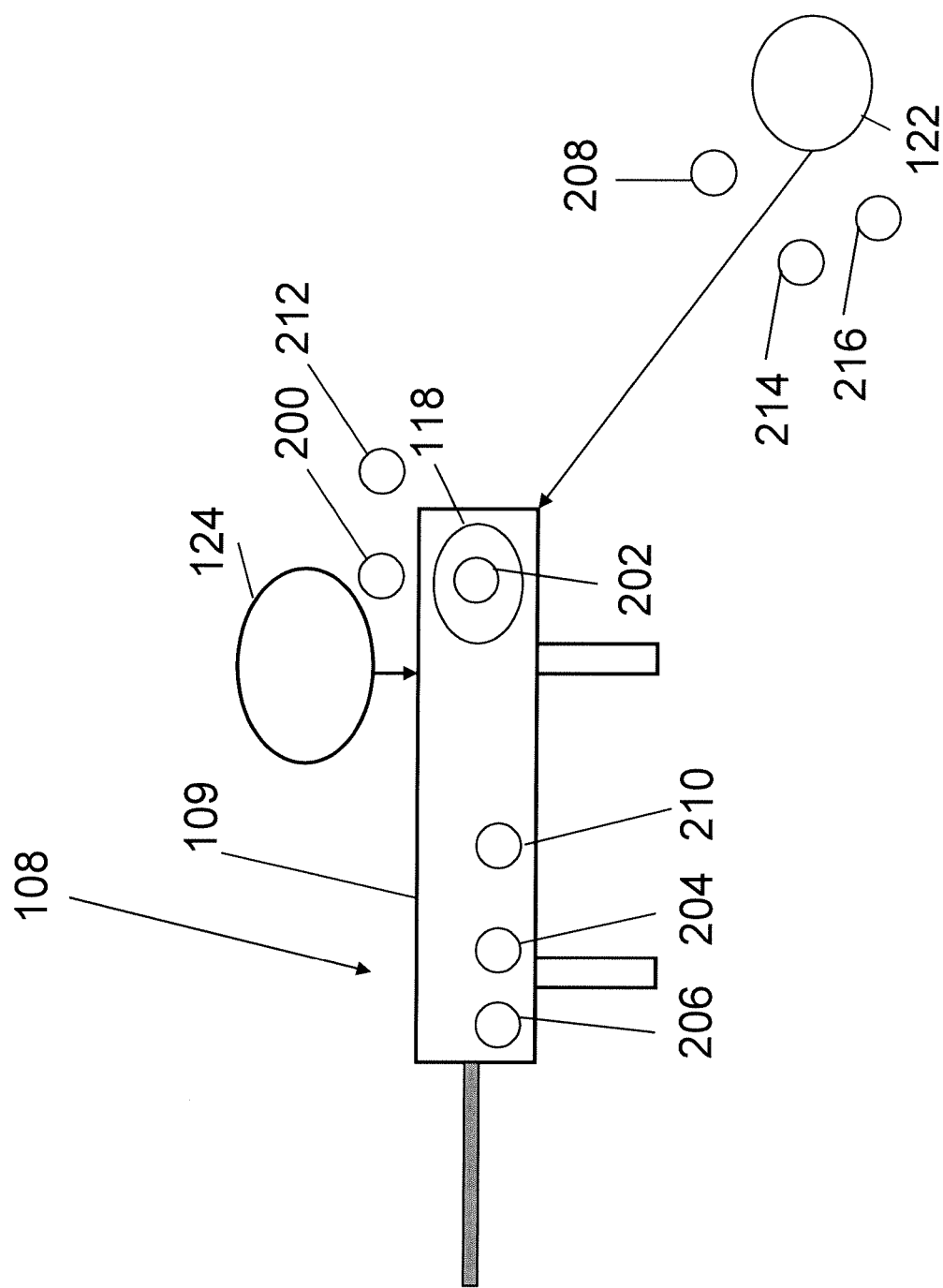
FIG. 2 is a schematic representation of an injection unit with sensors.

Referring now to FIG. 2, the injection unit 108 is further described. The drive 118 may include sensors 202. For an electric drive typical sensors 202 include those for temperature, voltage, and current. For a hydraulic drive, typical sensors 202 include those for temperature and hydraulic pressure.

The injection unit 108 also includes sensors 204 along a length of the barrel 109 for sensing temperature. The sensors 204 are also capable of measuring voltage, and current supplied to the electrical barrel heaters.

The injection unit 108 also includes pressure sensors 206 located upon a length of the barrel 109 to indicate pressure in the barrel 109, and pressure differentials before and after the check valve (not shown) located on the screw (not shown) and within the barrel 109 of the injection unit 108. Sensors 210 could also measure resin viscosity.

Sensors 200 determine the dryness of the raw material that is provided into a feed throat (not shown) of the injection unit 108. Sensors 212 could also measure the ambient air temperature and humidity (the operating environment around the molding system). Different raw materials require a different dryness in order to be processed and provide a good quality part.

Sensors 208 monitor the temperature and flow rate of the supplied chilled water. Sensors 214 could also monitor the physical properties of chilled water. In addition, sensors 216 could monitor voltage and current of the supplied power.

Sensors 200, 208, and 212 are intended to monitor external factors that could lead to damage of the molding system 100, components, or molded parts (not shown). For example, dirty electricity, voltage/current spikes, poor water quality, poor quality hydraulic oil, air quality, pollution, machine vibrations and dust.

Figure 3:
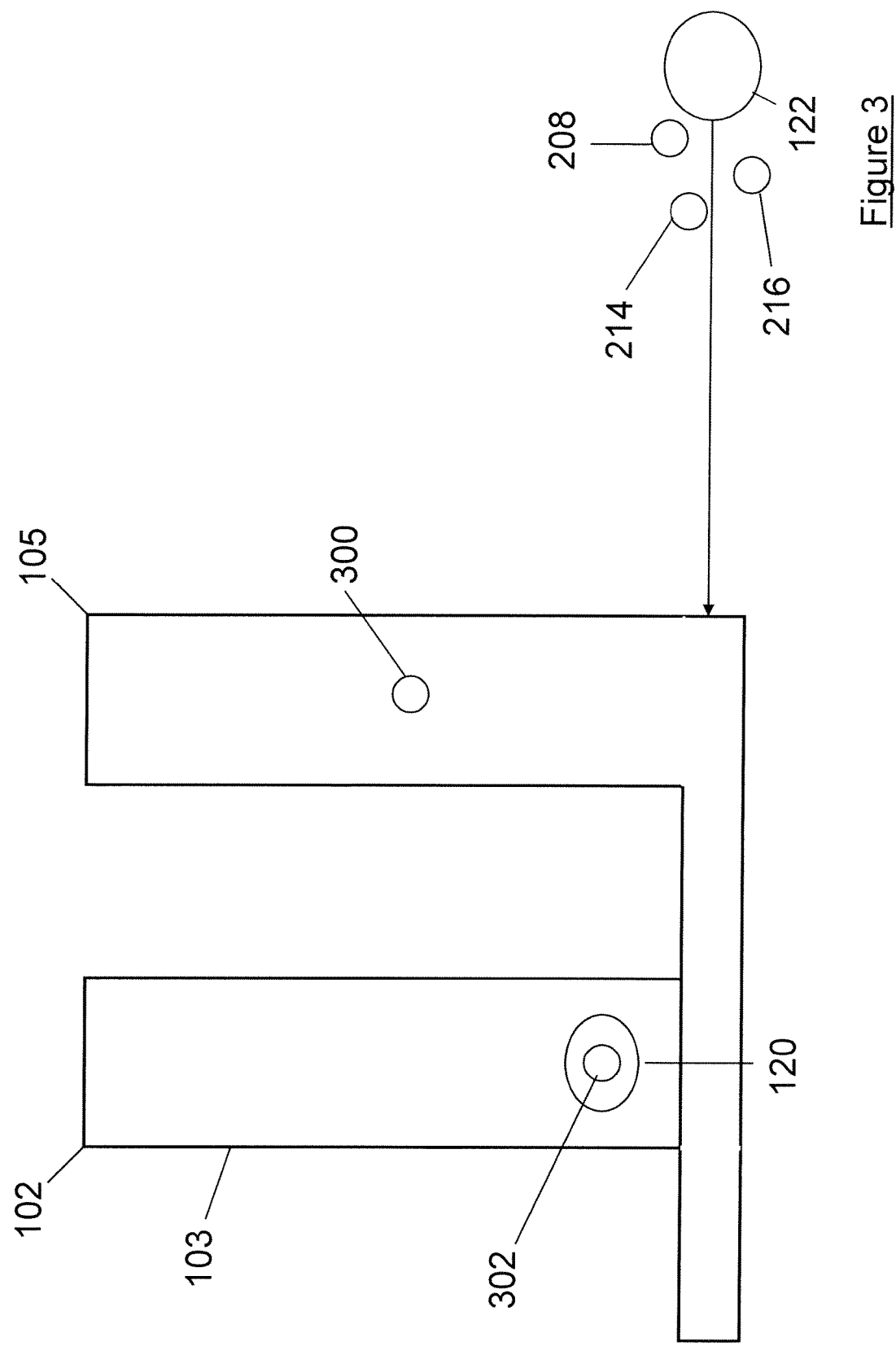
FIG. 3 is a schematic representation of a clamp with sensors.

Referring now to FIG. 3, the clamp 102 is further described. The clamp 102 includes a drive 120. For the case of an electric drive, the sensor 302 may monitor voltage, current, and temperature. For the case of a hydraulic drive, the sensor 302 may monitor, temperature and pressure. A hybrid drive would have a combination of sensors. The clamp 102 also includes various sensors 300 to monitor stress, strain, and positional alignment of the platens 103, 105.

Figure 4:
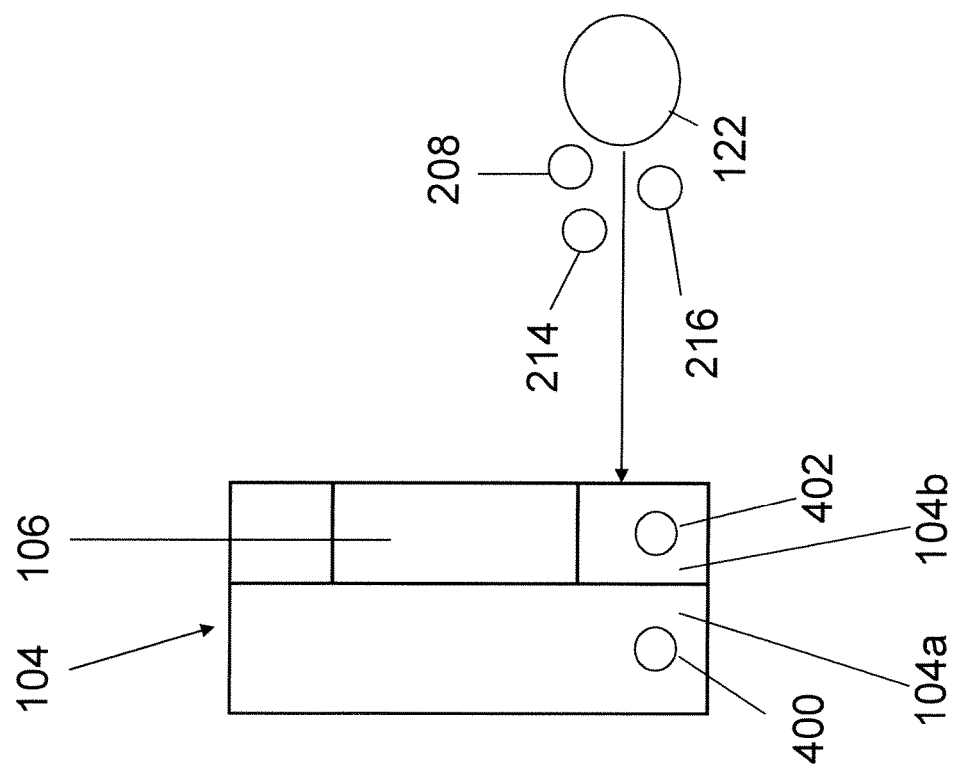
FIG. 4 is a schematic representation of a mold with sensors.

Referring now to FIG. 4, the mold 104 is further described. The mold 104 includes a cold half 104A and a hot half 104B. The hot runner 106 is mounted in a hot half 104B. Sensors 400 monitor the temperature of the chilled water required to cool the part (not shown). Sensors 402 monitor the temperature of the hot half (104B). Location of sensors 400 and 402 could be cavity by cavity, or regional within a single cavity (not shown). Additional sensors (not shown) may be applied to detect flash, or misalignment between the hot half 104B and the cold half 104A, or detect removal of the parts from the mold, or monitor post mold cooling.

Figure 5:
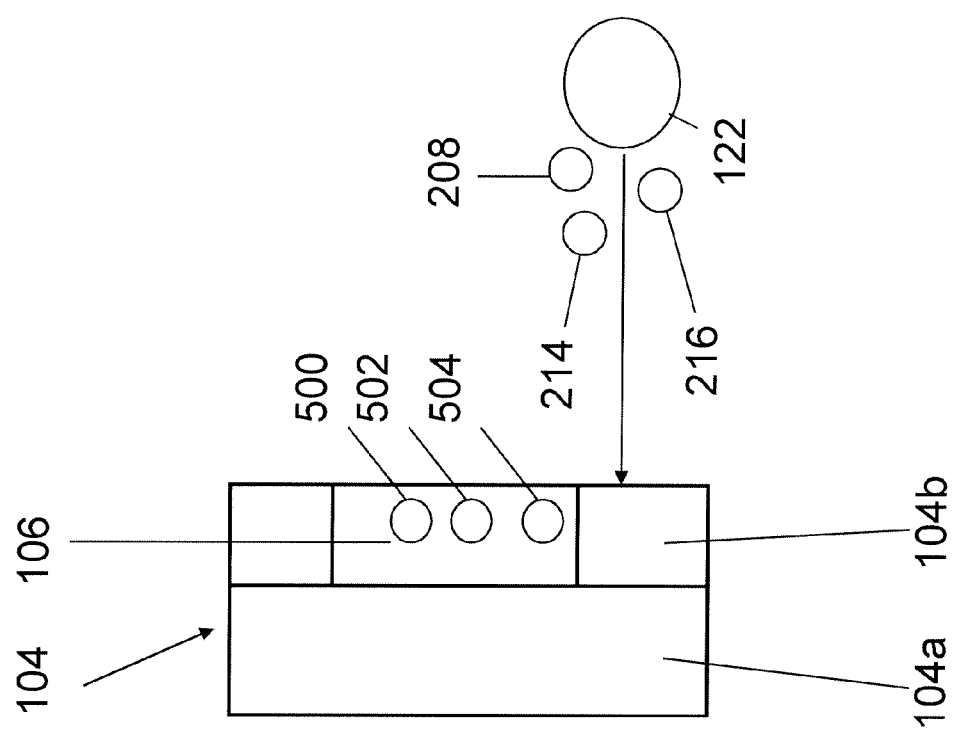
FIG. 5 is a schematic representation of a hot runner with sensors.

Referring now to FIG. 5, the hot runner 106 is further described. Sensors 500 monitor temperature of the melt and/or hot runner components (not shown) and sensors 502 monitor pressure of the melt in the hot runner system. Additional sensors 504 may be applied to determine the operation or position of a valve gate in a valve gated hot runner.

Referring back to FIG. 1, for systems having auxiliary equipment 119, sensors 519 are provided to collect operational data from the auxiliary equipment 119 previously described. It is contemplated that sensors 519 can be located beyond molding system 100, but operable to transmit operational data via a physical or wireless link (not shown) back to the molding system. For example, if auxiliary equipment 119 included a visioning system (not shown), then sensor 519 would detect problems with the molded parts 126 that in turn relates to problems with the molding system 100 or components of the molding system 100. As another example, the visioning system could detect the presence of a stringy gate which in turn relates to a potential temperature issue at a gate (not shown). In another example, auxiliary equipment 119 could include a parts bin located at the end of a conveyer belt which transports the molded articles from molding system 119. When the parts bin is full (determined by sensor 519), this information is transported back to molding system 100.

Figure 6:
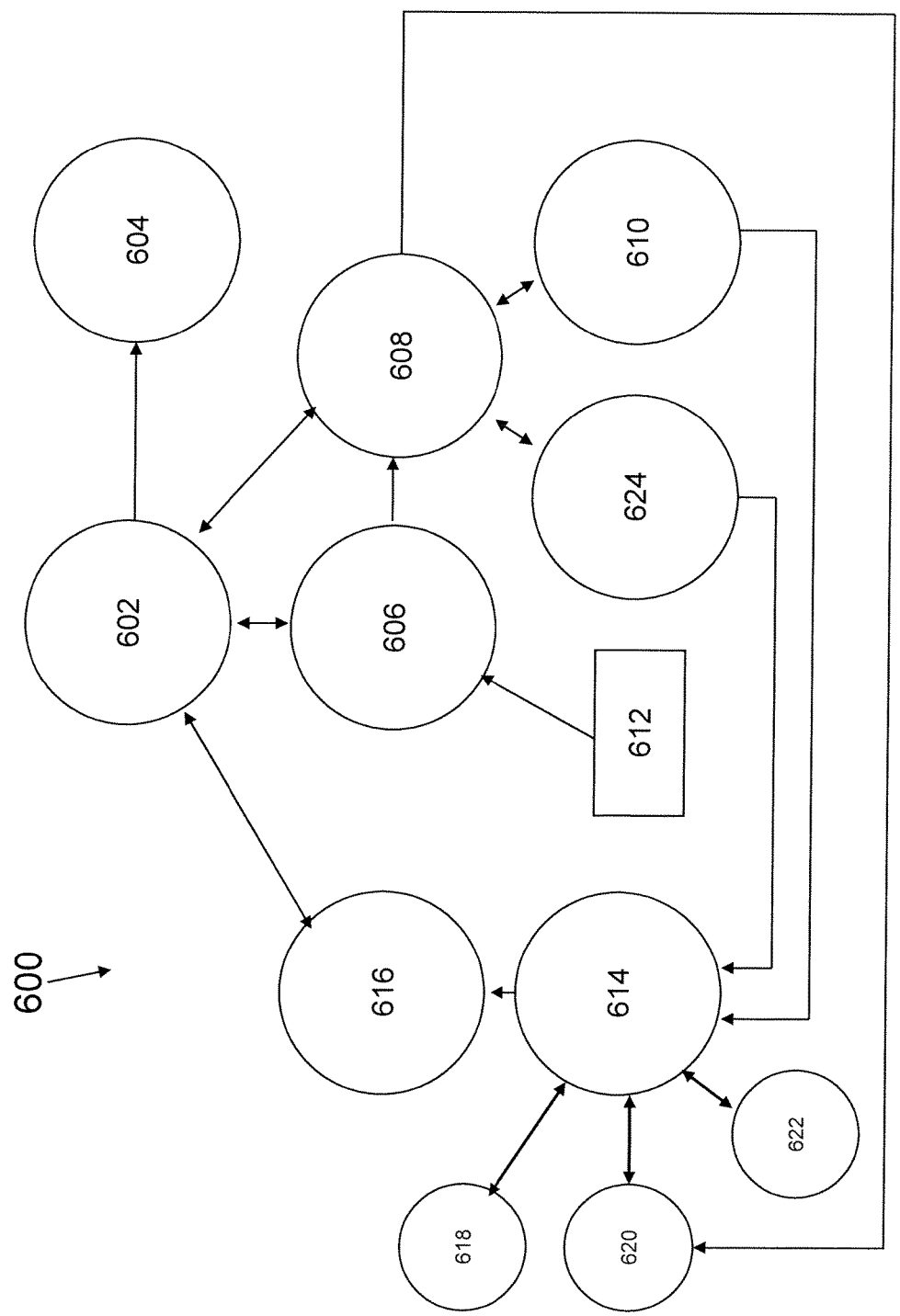
FIG. 6 is a schematic representation of a real time preventative maintenance system illustrating the pre-indicator portion of the system.

Referring now to FIG. 6, a real time preventative maintenance system 600, which provides preventative maintenance logic, in accordance with an embodiment of the present invention is described. The real time preventative maintenance system 600 includes sensors 612, which may include all or some of the sensors (200, 202, 204, 206, 208, 210, 212, 214, 216, 300, 302, 400, 402, 500, 502, 504 and 519) previously described. Persons skilled in the art will appreciate sensors 612 are readily available. For example, a thermocouple will sense temperature. A transducer will sense pressure. A voltmeter will sense voltage and an ammeter will sense current. In addition, persons skilled in the art will also appreciate a combination of sensors 612 could be arranged to monitor and provide unique parameters.

The real time preventative maintenance system 600 further includes a comparator module 602, which provides the logic to determine whether a sub-assembly or component of molding system 100 is operating outside of its normal range. The comparator module 602 has access to real time threshold data 616 and to real time operational parameters 606 (measured by the sensors 612.)

The real time threshold data 616 may include one or more of:

(a) minimum operational limit data,
(b) normal operational data (range), and
(c) maximum operational limit data.

It is contemplated that additional limits and ranges could be provided to provide a greater granularity. For example, real time threshold data 616 could include an "above" normal operational limit, and an "absolute" maximum operational limit. The real time preventative maintenance system 600 may include threshold data 616 for many operational measurements, such as voltage parameters, current parameters, pressure parameters, temperature parameters, humidity parameters, acidity parameters, alkalinity parameters, stress parameters, strain parameters, viscosity parameters, alignment parameters, machine vibration parameters and molded part quality parameters. Other types of threshold data 616 will occur to those of skill in the art. For example, with a particular drive 118, there are specifications for operating the drive under normal conditions. Optionally, there are operational limits (minimum and maximum) that provide a range of operational parameters for the drive. As another example, there are specifications for operating electrical heaters under normal conditions and optionally, limits (minimum and maximum) that provide a range of operational parameters for the heaters.

The real time operational parameters 606 may include real time measurements of voltage, current, pressure, temperature, humidity, acidity, alkalinity, stress, strain, viscosity, fluid cleanliness, alignment, and mold part quality, machine vibrations, amongst others, as measured in real time from the sensors 612.

Both the real time threshold data 616 and the real time operational parameters 606 are correlated for each aspect of the molding system 100. For example, they are correlated for the injection unit 108, clamp 102, mold 104, hot runner 106, auxiliary equipment 119, raw materials 124, and the supply 122. The data and parameters could also be correlated for additional devices and options such as post mold cooling.

The comparator module 602 compares the real time operational parameters 606 with the real time threshold data 616 to determine if a component is running within the normal range, below a minimum operational limit, or above a maximum operational limit, or a rate of change or frequency towards an operational limit.

If the comparator module 602 determines the component is running below the minimum operational limit or above a maximum operational limit, for the case wherein this is not allowed, the comparator module 602 will trigger a indicator module 604 to generate an alert notice for preventative maintenance. For the case where this is allowed for a period of time, or for a predefined number of occurrences exceeding the operational range without damage, then the comparator module 602 checks the history module 608 to determine the frequency information and data to see if the maximum frequency of this value has been exceeded and trigger the indicator module 604 to generate the alert notice indicating preventative maintenance is required. Using the data provided by history module 608, comparator module 602 can determine the frequency of occurrence in measured operational values, the rate of change, or determine trend lines (typically indicating a loss of performance).

comparator module 602 comparator module 602 comparator module 602 history module 608. Optionally, when comparator module 602 determines that a component is running above a maximum operational value or below a minimum operational value, it can throttle performance until preventative maintenance can be scheduled. This throttling can occur in iterative increments. For example, the injection cycle might be slowed 5% for a period of time, or for a defined number of occurrences. If comparator module 602 then determines that the component is still running above a maximum vale, then the injection cycle might be slowed an additional 5%, etc.

The indicator module 604 module may send preventative maintenance information 601 as part of its alert notice to the human machine interface (HMI) screen, to a central customer computer system, or to a remote manufacturer computer system or customer service computer system. The computer system communicates through a network (wired or wireless), the internet, an extranet or an intranet. Preventative maintenance information 601 includes, but is not limited to, customer identification, molding system identification, component identification, dates, and real time operational parameters.

Preventative maintenance information 601 can be represented on the human machine interface screen as an overall "health" score. 605. The health score 605 could indicate the operational efficiency of the molding system 100 as a percentage score, so that if molding system 100 was capable of 95% of its maximum rated operational speed, then health score 605 would be 95%. Alternatively, health score 605 could be an abstracted value of the molding system 100's operational health. For example, in a simple arrangement, health score 605 could start at 100%, but be reduced by 5% for every real time operational parameters 606 that is detected out of its preferred operational range. It is contemplated that the adjustment to health score 605 could be related to the degree that an operational parameter 606 is detected out of operational range. Thus, if hydraulic pressure is determined to be below a minimum operational limit by a first amount, then health score 605 would be decreased 5%, but if hydraulic pressure is determined to be below the minimum operational limit by a second amount, then health score 605 would be decreased 10%. It is further contemplated that the adjustments to the health score 605 could be weighted based on the severity of the out-of-limits condition. Thus, if sensors measure that the oil is contaminated by particulates above a maximum value, then health score 605 could be decreased by a greater amount than if the operational temperature of the system is too high. The rules for determining the value of health score 605 could be set by a customer, or alternatively, could be set by the manufacturer to ensure standardization of health scores 605 across all systems. Alternatively, the rules for determining the value of health score 605 could be set by the manufacturer, but customized to each customer according to a particular service level agreement between the two.

It is also contemplated that the health score 605 could be represented by a visual representation so that a score of 90 or greater would be indicated by a green light, a score of 65-89% would be indicated by a yellow light, and a score of 64% or lower would be indicated by a red light. Alternatively, a health score 605 could be indicated by a green light when comparator module 602 detects that no sensors 612 are out of their preferred range, a yellow light when one or more sensors 512 are out of their preferred range, and by a red light when any sensors 612 are out of their preferred range by a second threshold indicating a more critical condition. Other visual representation of heath scores, and other rules for determining the severity of the health score will occur to those of skill in the art.

The history module 608 receives real time operational parameters 606, and uses it to build and maintain a frequency database 624. For example, frequency database 624 could record the number of times, or length of time a component may be operating below the minimum value or above the maximum value. The history module 608 could contain the number of times, or length of time that performance in molding system 100 has been throttled. Preferably, the history module 608 also contains the limit information for the system, sub-systems, components and parts of molding system 100. Also preferably, the history module 608 module also builds and maintains a trends database 610. The trends database 610 contains trend data with respect to the operation of the molding system 100. Examples of trend data include rate of change data for a measured value, or a change in performance over time for a measured value, or a leakage rate.

The updater module 614 maintains the real time threshold data 616 and provides the logic to modify the real time threshold data 616 based upon prior events. Initially, the manufacturer of a component, part, system, or sub-system provides the initial and present tense operational data such as the minimum real time operational limits, the maximum real time operational limits, and the normal operational range. Optionally for the minimum and maximum operational limits, an amount of time, or an accumulated amount of time, or a frequency of occurrence may be provided to understand when a component has been damaged, but will continue to work for some limited amount of time without immediate failure. In addition, the updater module 614 indicates trends towards a failure as well as failure when it occurs. For example, a drive 118 may be operated at maximum horse power rating for five minutes and 75% of maximum power continuously without damage. But, if the drive 118 is operated a maximum horse power for eight minutes, it will be damaged but not necessarily to the point of immediate failure. Preventative maintenance is therefore required before failure of the drive 118.

However, once the molding system 100 has been in operational use for a period of time, the operational limits may change. For example, if a particular customer is known to operate the molding system 100 aggressively, the operational history provided by customer data 620 may modify the operational data to different limits for preventative maintenance. Customer data 620 can include the operational history of molding system 100 (as provided by history module 608), the operational history of other molding systems (not shown) operated by the customer, or preferred values provided by the customer. For example, one customer might prefer an aggressive parts replacement schedule in order to minimize downtime. The updater module 614 is adaptive and may modify the operational data based upon the customer data 620.

The future operational data may also change based upon updates provided by the manufacturer data 618. For example, the manufacturer may provide a hardware or software upgrade, which affects the operational limits of molding system 100. Alternatively, the manufacturer may notice a recurrent problem with the product line and issue a technical service bulletin. Manufacturer data 618 may modify the operational data to different limits for preventative maintenance. The updater module 614 may modify the operational data based upon the manufacturer data 618.

The future operational data may also change based upon a geographic location. For example, if a molding system is located in a high humidity or high altitude environment, the geographic location data 622 may modify the operational data to different limits for preventative maintenance. The updater module 614 may modify the operational data based upon the geographic data 622.

The updater module 614 also receives data from the frequency module 624 and the trends database 610 and is adaptive to the environment to modify the data based upon real time use of the molding system 100. For example, if an upper temperature limit was thought to be 400 degrees but later determined through use of the molding system 100 to be 350 degrees, then the real time threshold data 616 would be updated accordingly. In addition, the updater module 614 takes customer data 620 and geographic data 622 to build a repository of system and component intelligence. This intelligence includes the same model of molding systems operated at different customer locations by different customers in different geographic locations.

The update module 614, associated logic, circuitry, and data may be located or integrated with component parts as well as the complete molding system. For example, a first updater module 614 may be located with a mold. A second updater module 614 could be located with a hot runner. A third updater module 614 could be located with a power pack 110. Then, the real time threshold data 616 stays with the associated system, sub-system, or component part. If a mold 104 is removed from production, it can be re-introduced back into production with the last known operational data. In addition, if a hot runner 106 has to be refurbished, it contains the last known operational data.

Preventative Maintenance Indicator System:

The comparator module 602, real time operational parameters 606, sensors 612, and real time threshold data 616 may be combined to form a preventative maintenance Indicator System.

In an embodiment of the invention the indicator system includes a comparator module 602, at least one real time threshold data 616, and sensors 612. The sensors 612 provide at least one real time operational parameter 606. The comparator module 602 comparing the at least one real time operational parameter 606 with the at least one real time threshold data 616 to indicate operational status. The comparator 602 indicates an out of tolerance condition if the operational status is either below a minimum operational limit or above a maximum operational limit.

Additionally, data from history module 608 may be available to the comparator module 602.

In an embodiment of the invention, the indicator system includes a method for sampling at least one real time operational parameter data 606 from at least one sensor 612 of molding system 100. Comparator module 602 compares the at least one real time operational parameter 606 with at least one real time threshold data 616 to indicate the operational status of molding system 100.

If the operational status is below a minimum operational limit or above a maximum operational limit, the comparator module 602 further determines if this condition cannot be tolerated, or if this condition has occurred more than a maximum number of times. If the answer is yes, comparator module 602 indicates preventative maintenance is required. Operational limits may include at least one maximum limit and/or one minimum limit. These limits may be based upon units of time, frequency of occurrence, or other pre-defined molding system parameters.

The real time operational parameters 606 and the real time operational threshold data 616 may include: voltages, currents, pressures, temperatures, humidity, acidity, alkalinity, stress values, strain values, alignment information, viscosity, machine vibrations or molded part quality, amongst others. Additionally, the real time threshold data 616 may include at least one of a normal operational range value, a minimum limit value, or a maximum limit value, amongst others.

The comparator module 602 produces an alert notice in indicator 604, which may indicate preventative maintenance for at least one of a molding system 100, a subsystem of the molding system 100, (such as injection unit 108 or hot runner 106), or a component part of the molding system 100, or one of its subsystems or auxiliary or supply systems.

The real time threshold data 616 may pertain to at least one of the following, a particular customer, a geographic location, multiple customers, or multiple geographic locations.

Preventative Maintenance Update System:

The updater module 614, history module 608, frequency module 624, trends database 610, manufacturer data 618, customer data 620, and geographic location data 622 may be combined to form a preventative maintenance update system. This system keeps the real time threshold data 616 up to date and current.

In an embodiment of the invention the apparatus for updating preventative maintenance data of a molding system includes an updater module 614, and a real time threshold data 616. The updater module 614, having access to history module 608 data, provides periodic updates to the real time threshold data 616. The updater module 614 may determine which categories are applied to update the real time threshold data 616. Updater module 616 may access to history module 608 remotely, locally, or globally. The updater may modify at least one data parameter of the normal operational range value, or a minimum limit value, or a maximum limit value for real time threshold data 616.

In an embodiment of the invention, the method for updating preventative maintenance data of a molding system 100 includes:

i) receiving real time operational parameters 616 and storing the data in history module 608;
ii) sorting the history module 608 data into categories; and
iii) sending real time periodic updates to real time threshold data 616.

The apparatus for updating preventative maintenance data of a molding system 100 may be located with one of the following: molding system, power pack, injection unit, clamp, mold, hot half, cold half, hot runner, control system, auxiliary equipment or a molding system component. There may be one apparatus for updating preventative maintenance data of a molding system or a plurality of apparatus for updating preventative maintenance data of a molding system distributed around the system as previously described.

The categories of history module 608 data may include at least one of frequency data 624, trends database 610, manufacturer data 618, a plurality of manufacturer data 618, customer data 620, a plurality of customer data 620, geographic location data 622, and a plurality of geographic location data 622.

Figure 7:
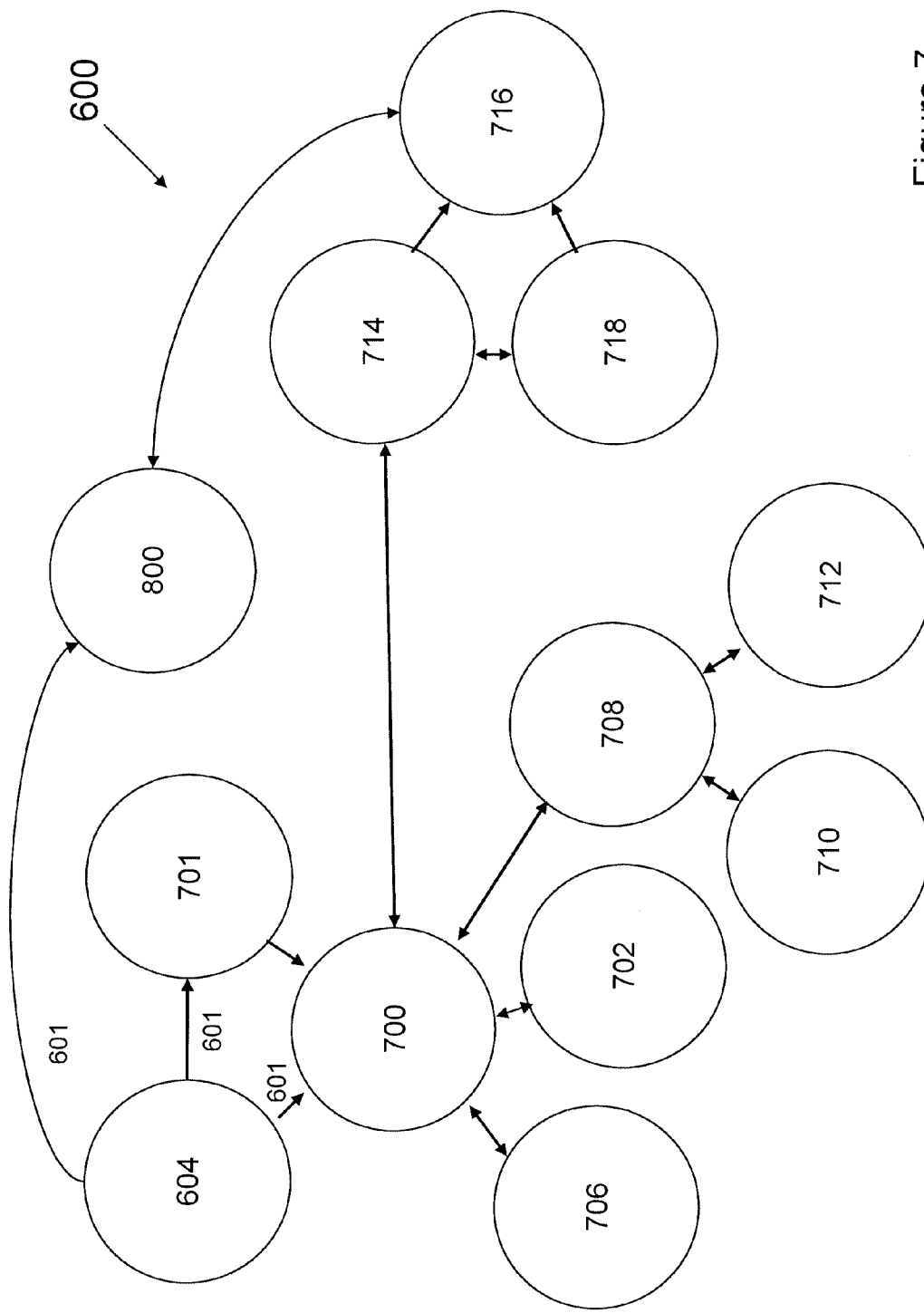
FIG. 7 is also a schematic representation of a real time preventative maintenance system illustrating the post-indicator portion of the system.

Referring now to FIG. 7, the preventative maintenance system 600 is further described, once an alert notice has been sent. As previously stated, the indicator module 604 module may send, as an alert notice, preventative maintenance information 601 to a customer system 702 or a manufacturer (or customer service provider) having a preventative maintenance capability 700. This event may occur from a plurality of customers, a plurality of molding systems 100, or a plurality of geographic locations. Optionally, the customer 702 may manually provide the preventative maintenance information 601 to the manufacturer for analysis and resolution.

Upon receipt of preventative maintenance information 601, a general practitioner 714, such as a customer service representative, may become involved to assess the problem and take corrective action. If the general practitioner 714 cannot resolve the problem nor take corrective action, then a specialist 718, such as a higher level customer service representative, may become involved to assess the problem/symptoms, and perform a root cause analysis to take corrective action or provide recommendations or actions to adjust the molding system process parameters. Optionally, both the general practitioner 714 and the specialist 718 have access to customer's molding systems 100 through a remote control and diagnostic system 716 such as the Husky® ServiceLink™ technology. The ServiceLink™ technology provides a connection from a remote computer through a network/internet connection to the compatible control system 114 (equipped with the Polaris® controls) of molding system 100.

In one embodiment, the operational status of multiple molding systems 100 can be displayed on a global health system 800. Global health system 800 receives preventative maintenance information 601 and/or health scores 605 from multiple molding systems 100 via the remote control and diagnostic system 716. Preferably, global health system 800 is operable to display on-screen the health scores 605 for all machines transmitting their preventative maintenance information 601. Also preferably, global health system 800 displays the health scores 605 on a map display that shows the geographical location of each connected molding system 100, based upon geographical data 622. A global health system 800 could be offered by a manufacturer to provide a monitoring service for all their clients who agree to subscribe to a service level agreement.

A service scheduler 702 receives the preventative information 601 from the preventative maintenance module 700. This may occur automatically to schedule preventative maintenance or manually requested by general practitioner 614 or specialist 718. The service scheduler 702 provides scheduling logic and attempts to align preventative service with known customer down time or service time. For example, fit preventative service into known gaps in production cycles, or within scheduled down times. Essentially, service scheduler 702 creates a match between the service provider and the customer when the service provider has personnel and parts ready at the same time the customer is not in an active production run. Preferably, service scheduler 702 includes a lookup table of time lengths required for each known preventative service. For example, a filter change may require 30 minutes of down time, but a mold change would require 8 hours. Service scheduler 702 could locate the next available gap in production cycles or scheduled down times of sufficient length to accommodate the preventative service. Service events and planning include upgrades, a change part date, scheduled service, and production cycle scheduled down time. In summary, when an out of tolerance condition is detected by the comparator module 602 which could lead to an instability or failure of the molding system 100, preventative maintenance of this issue is scheduled into the next available service event. As mentioned previously, a comparator module 602 could throttle the operation of a molding system 100 when a problem is detected. It is also contemplated that service scheduler 702 could move some or all of the jobs scheduled for the molding system 100 to another molding system 100, depending on the severity of the problem. By moving all the jobs scheduled for the problematic molding system 100, job scheduler 702 could create sufficient down time for maintenance to occur.

A parts system 708 also receives preventative maintenance information 601. The parts system 708 provides supply logic and ensures an available supply of parts through inventory management 712. In addition, an inventory location module 710 ensures parts are either stored in a central repository, or a distributed repository based upon the geographic or customer information provided with the preventative maintenance information 601. The inventory management 712 module may also interact with other vendors and supply chain management software to better predict a supply of spare parts based upon the frequency and trend data available in the preventative maintenance information 601. If a service agreement is in place between the customer and the manufacturer, parts system 708 could automatically order the required repair parts to be shipped to the location of molding system 100. Parts system 708 could interact with service scheduler 702 to automatically order the required repair parts, and schedule a service technician from the manufacturer to perform preventative maintenance during a known gap in the production cycle.

A business system 706 provides the necessary financial accounting and business level logic required as a result of the customer service and spare parts activity with a customer.

Preventative Maintenance System

The preventative maintenance module 700, business system 706, service scheduler 702 and parts system 708 may be grouped to form a preventative maintenance system for a molding system.

In an embodiment of the invention, the preventative maintenance module 700 may communicate an indication for preventative maintenance to a general practitioner 714 for resolution. The general practitioner 714 in turn may transfer the indication for preventative maintenance to a specialist 718. Alternatively, the preventative maintenance module 700 may communicate an indication for preventative maintenance directly to the specialist 718. Both the general practitioner 714 and specialist 718 may have access to remote control 716 logic for inspecting molding system 100, or resolving the need for preventative maintenance. Confirmation may be passed back to the preventative maintenance module 700.

The preventative maintenance module 700 logic may communicate with business system 706 for automated invoicing and billing. The preventative maintenance module 700 may also communicate with service scheduler 702 to schedule service. Scheduling service may be based upon fit into a service provider's schedule, or fit to a customer schedule, or fit to a predetermined existing customer maintenance schedule, or fit to availability of service personnel, or fit to the availability of service parts.

The preventative maintenance module 700 may also communicate with parts system 708 to manage parts inventory with either a central parts inventory or a distributed parts inventory. In an embodiment of the invention, the method for real time preventative maintenance of a molding system includes indicating an out of tolerance condition based upon a real time operational status, and creating an alert notice for preventative maintenance. The alert notice for preventative maintenance may be communicated directly to a customer system 702 of a service provider system. The customer system 702 in turn may communicate with the service provider system.

The preventative maintenance system 700 may send communications to either a general practitioner 714 or a specialist 716 for resolution. Either of the general practitioner 714 or specialist 716 may have remote access and control of the molding system 100 for conducting a preventative maintenance inspection and they may communicate the need for preventative maintenance.

In an embodiment of the invention, the real time preventative maintenance system 600 is embodied in the control system 114 of a molding system 100. Alternatively, it may be embodied as a stand alone system at a customer's factory. Alternatively, it may be embodied as a stand alone system at an equipment manufacturer's site providing customer service. Alternatively, it may be partially embodied in the control system 114 of a molding system 100 and interacting with other software systems distributed at a customer site or a manufacturer's site. The real time preventative maintenance system 600 may be implemented in hardware, firmware, software or a combination of hardware, firmware, and software. Persons skilled in the art will also appreciate that the preventative maintenance system 600 may be a single integrated system, or a distributed system, with one or many software/firmware modules, with one or many hardware components and one or many integrated or separate databases.

The description of the exemplary embodiments provides examples of the present invention, and these examples do not limit the scope of the present invention. It is understood that the scope of the present invention is limited by the claims. Having thus described the exemplary embodiments, it will be apparent that modifications and enhancements are possible without departing from the concepts as described.

What is claimed is:

1. A real time preventative maintenance system for real time preventative maintenance of a molding system, the real time preventative maintenance system comprising:
    a processor configured to execute a preventative maintenance logic, the preventative maintenance logic directing the processor to:
    receive operational data, in real time, from one or more sensors attached to one or more corresponding sub-assemblies and components of the molding system;
    identify indicators, based on the one or more sensors being monitored, of a potential premature failure of the one or more corresponding sub-assemblies and components of the molding system;
    determine that the operational data indicates a condition outside of an operational threshold that can lead to the potential premature failure of the one or more corresponding sub-assemblies or components of the molding system;
    automatically schedule preventative maintenance of the molding system based on the operational data before an actual failure of the one or more corresponding sub-assemblies or components of the molding system at a time that is best fit to a production cycle of the molding system;
    throttle operation of the molding system when a determination is made that the operational data indicates a condition outside of an operational threshold that can lead to the potential failure of the one or more corresponding sub-assemblies or components of the molding system; and
    update the operational threshold based on one or more events comprising environmental changes, customer data, manufacturer upgrade and geographical location based upon real time use of the molding system.

2. The real time preventative maintenance system of claim 1, wherein:
    the preventative maintenance logic directs the processor to:
    predict or indicate the potential failure in advance of the actual failure of the one or more corresponding sub-assemblies and components of the molding system.

3. The real time preventative maintenance system of claim 1, wherein:
    the preventative maintenance logic directs the processor to:
    indicate a trend towards the potential failure as well as indicate the actual failure when it occurs.

4. The real time preventative maintenance system of claim 1, wherein:
    the preventative maintenance logic directs the processor to automatically schedule preventative maintenance of the molding system comprises:
    the preventative maintenance logic directs the processor to move some or all jobs scheduled for the molding system to another molding system to create sufficient down time for maintenance to occur.

5. The real time preventative maintenance system of claim 1, wherein:
    the real time preventative maintenance system is embodied in a control system of the molding system.

6. The real time preventative maintenance system of claim 1, wherein:
    the real time preventative maintenance system is embodied as a stand alone system at one of a customer factory and an equipment manufacturer's site providing customer service.

7. The real time preventative maintenance system of claim 1, wherein:
    the real time preventative maintenance system is partially embodied in a control system of the molding system and interacts with other software systems distributed at a customer site or a manufacturer's site.

8. The real time preventative maintenance system of claim 1, wherein the preventative maintenance logic directs the processor to:
    generate an alert notice.

9. The real time preventative maintenance system of claim 1, wherein: wherein identifying indicators comprises sampling at least one real time operational parameter data from the at least one sensor of the molding system.

10. The real time preventative maintenance system of claim 9, wherein identifying indicators further comprises comparing the real time operational parameter with a real time threshold data.

11. The real time preventative maintenance system of claim 1, in combination with the one or more sensors.

12. The real time preventative maintenance system of claim 11, wherein one of the one or more sensors measures one of: voltage, current, temperature, pressure, humidity, and flow rate.

13. The real time preventative maintenance system of claim 11, wherein the component that one of the one or more sensors is attached to comprises one of: a drive that provides operational power for a screw of the molding system, a barrel of the molding system, and a mold.

14. The real time preventative maintenance system of claim 1, further comprising a history module for storing the one or more events.

15. The real time preventative maintenance system of claim 14, wherein updating the operational threshold comprises setting a minimum real time operational limit, a maximum real time operational limit and a normal operational range.

16. The real time preventative maintenance system of claim 14, wherein updating the operational threshold comprises updating the minimum real time operational limit based on the operational history of the molding system, and updating the maximum real time operational limit of the molding system.

* * * * *